(12) United States Patent
Nordahl

(10) Patent No.: US 10,159,945 B2
(45) Date of Patent: Dec. 25, 2018

(54) METHOD AND A DEVICE FOR MAKING A MULTI-COMPONENTS PRODUCT MATERIAL

(71) Applicant: WAISTER A/S, Sem (NO)

(72) Inventor: Geir Nordahl, Våle (NO)

(73) Assignee: Waister AS, Sem (NO)

( * ) Notice: Subject to any disclaimer, the term of this patent is extended or adjusted under 35 U.S.C. 154(b) by 321 days.

(21) Appl. No.: 14/892,534

(22) PCT Filed: May 20, 2014

(86) PCT No.: PCT/NO2014/050081
§ 371 (c)(1),
(2) Date: Nov. 19, 2015

(87) PCT Pub. No.: WO2014/189385
PCT Pub. Date: Nov. 27, 2014

(65) Prior Publication Data
US 2016/0107129 A1     Apr. 21, 2016

(30) Foreign Application Priority Data

May 22, 2013   (NO) .................................. 20130713

(51) Int. Cl.
| | | |
|---|---|---|
| *B01F 7/20* | (2006.01) | |
| *B01F 3/14* | (2006.01) | |
| *B01F 3/20* | (2006.01) | |
| *B01F 7/00* | (2006.01) | |
| *B01F 7/04* | (2006.01) | |
| *B01F 15/02* | (2006.01) | |
| *B01F 15/06* | (2006.01) | |
| *B01F 3/12* | (2006.01) | |
| *H01M 4/04* | (2006.01) | |
| *B01F 7/16* | (2006.01) | |

(52) U.S. Cl.
CPC .............. *B01F 3/14* (2013.01); *B01F 3/1214* (2013.01); *B01F 3/1221* (2013.01); *B01F 3/1271* (2013.01); *B01F 3/2078* (2013.01); *B01F 7/00141* (2013.01); *B01F 7/047* (2013.01); *B01F 7/166* (2013.01); *B01F 7/1665* (2013.01); *B01F 7/20* (2013.01); *B01F 15/027* (2013.01); *B01F 15/0267* (2013.01); *B01F 15/063* (2013.01); *H01M 4/0433* (2013.01); *B01F 2015/0221* (2013.01); *B01F 2015/062* (2013.01)

(58) Field of Classification Search
USPC ........................................................ 366/144
See application file for complete search history.

(56) References Cited

U.S. PATENT DOCUMENTS

| | | |
|---|---|---|
| 3,941,357 A | 3/1976 | Wurtz |
| 2007/0060676 A1 | 3/2007 | Reinke |
| 2013/0058719 A1 | 3/2013 | Warlow et al. |

FOREIGN PATENT DOCUMENTS

| | | |
|---|---|---|
| EP | 0861804 A1 | 9/1998 |
| EP | 1094531 A2 | 4/2001 |
| EP | 1408157 A2 | 4/2004 |
| EP | 1990085 A2 | 11/2008 |
| WO | 93/09295 A1 | 5/1993 |
| WO | 2006/114605 A1 | 11/2006 |
| WO | 2010/011171 A1 | 1/2010 |

OTHER PUBLICATIONS

Office Action dated Nov. 8, 2016 in CN Application No. 2014800291217.

*Primary Examiner* — Mark Halpern
(74) *Attorney, Agent, or Firm* — Knobbe, Martens, Olson & Bear, LLP

(57) ABSTRACT

A method and a device are for making of a multi-components product material. The device includes a processing and homogenizing chamber for primary particle components. The chamber includes at least two sets of rotary shovels, which rotate in parallel in a mutually counter-rotating, homogenizing mode, inlet(s) into the chamber for at least one secondary component in a fluid state and/or fine particulate material state, which interacts with the primary components while they are moved around in the chamber by sets of the shovels, and an outlet in the chamber to allow the primary and secondary components to leave the chamber as the multi-component product material.

17 Claims, 8 Drawing Sheets

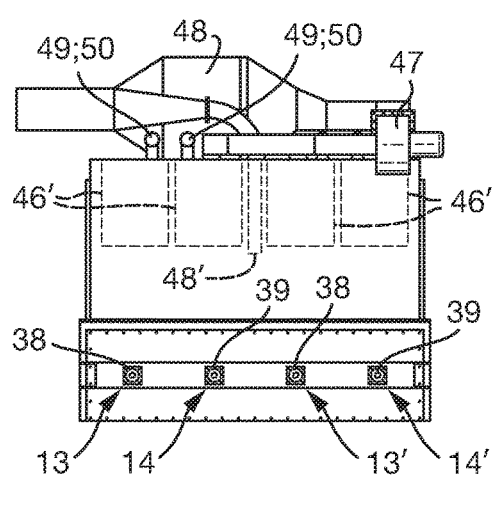
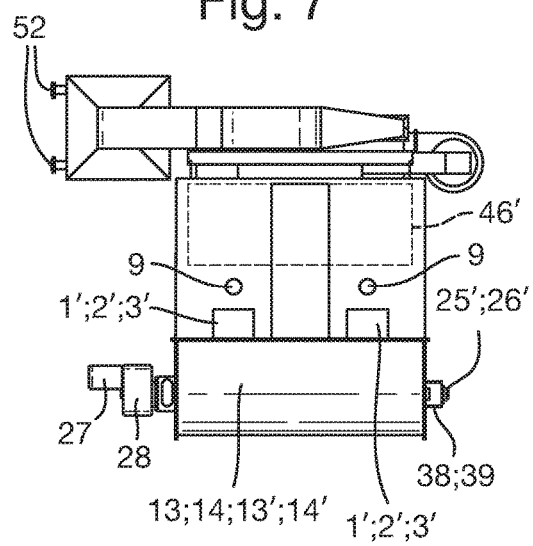
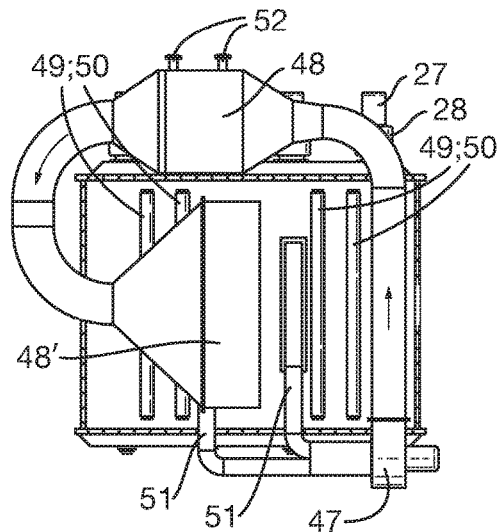
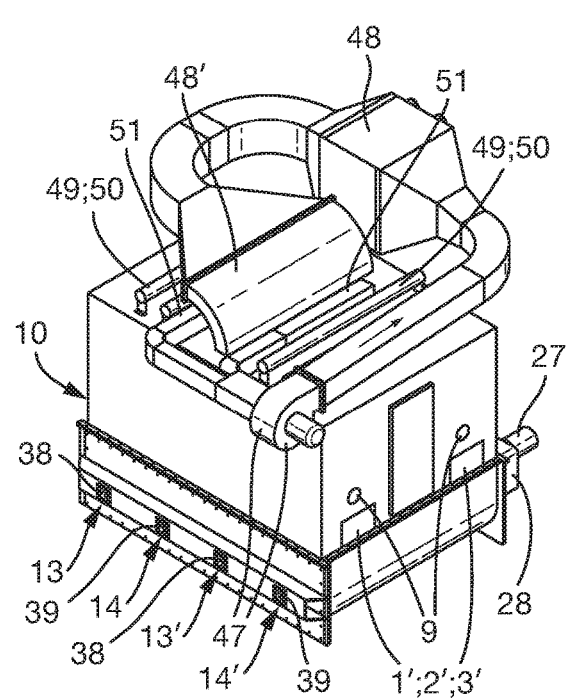

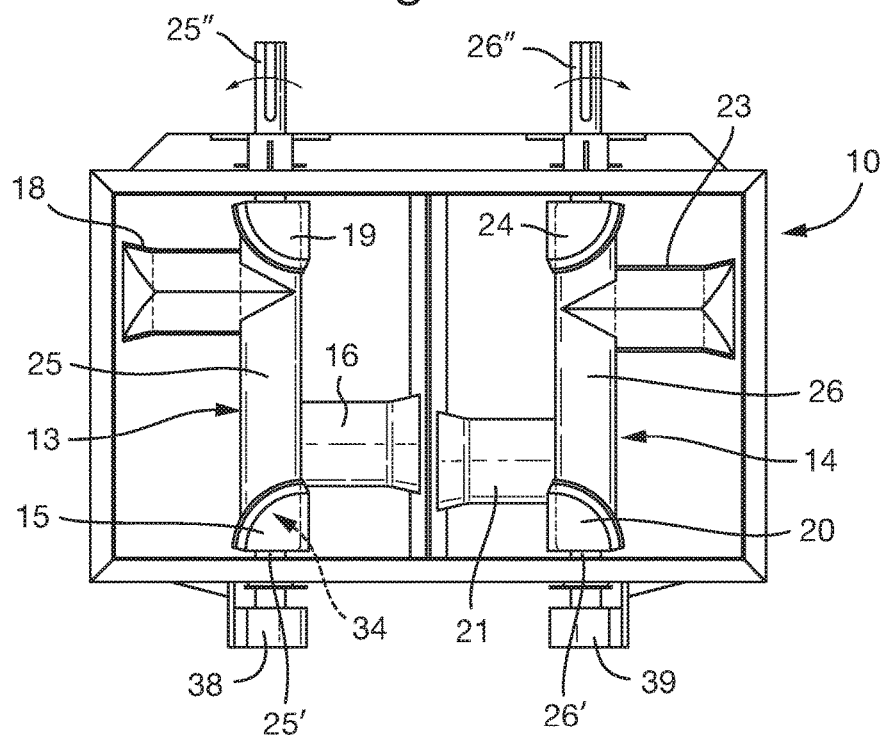
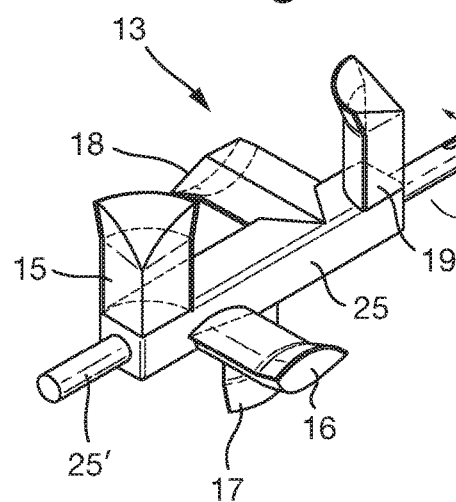
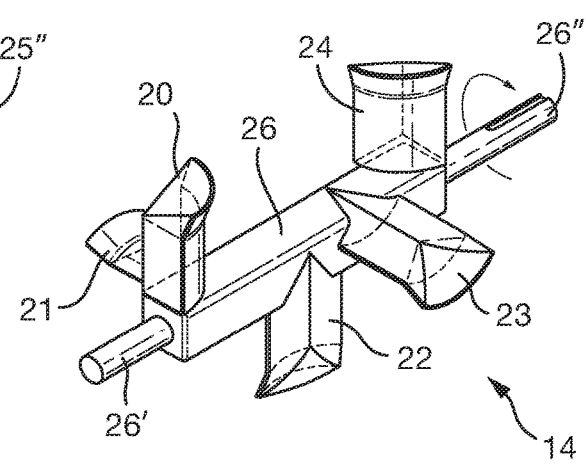

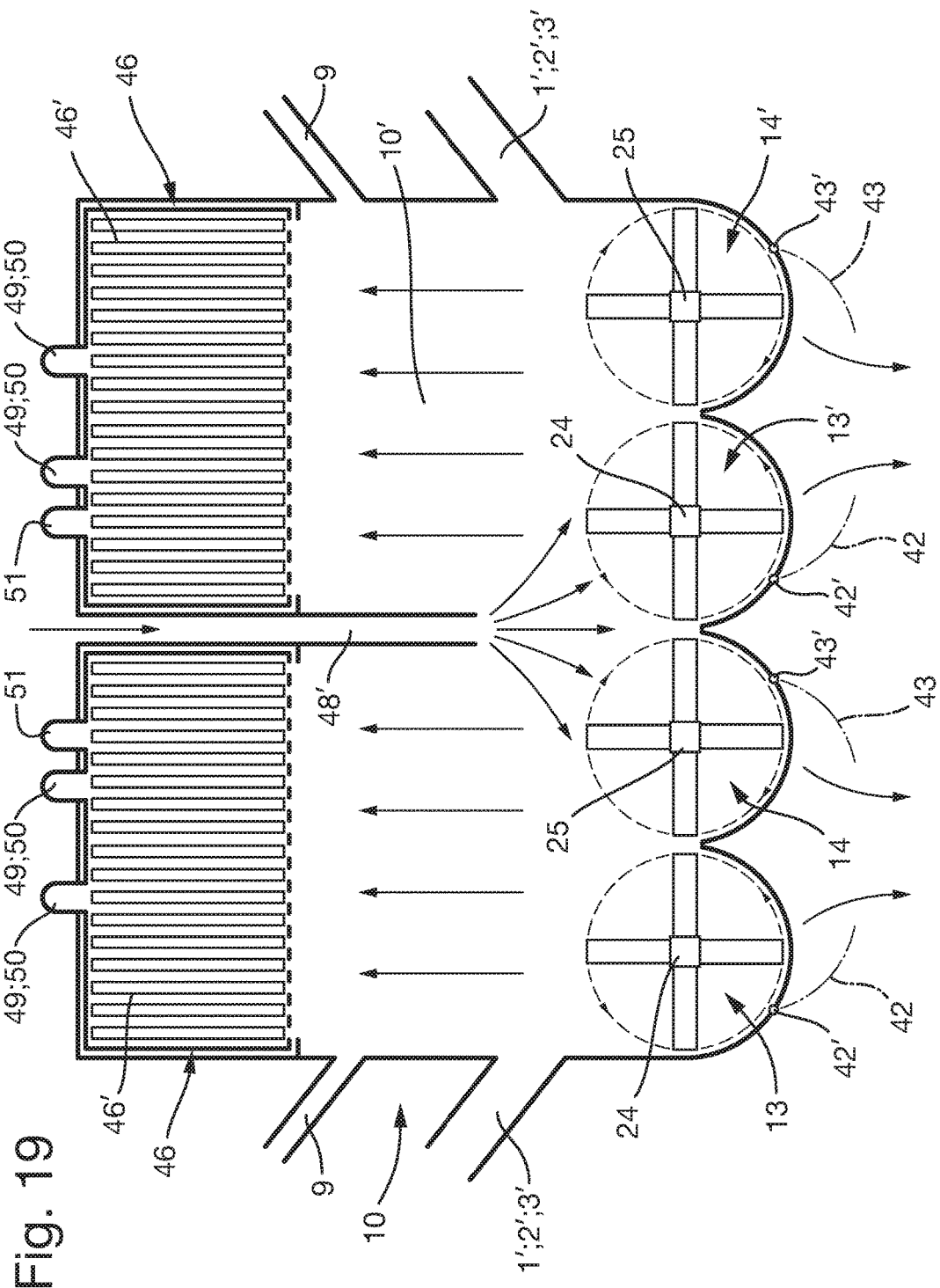

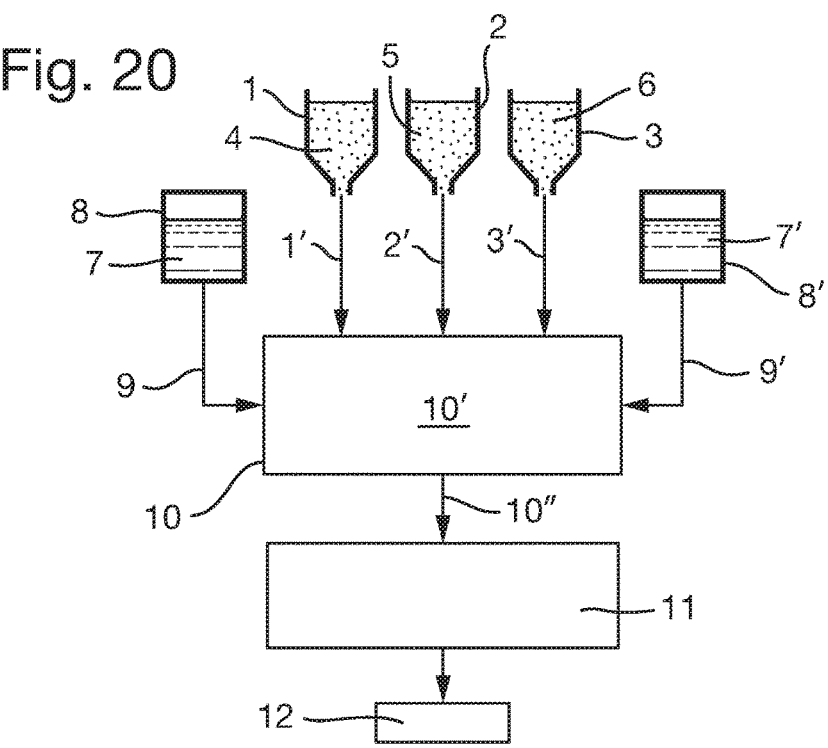
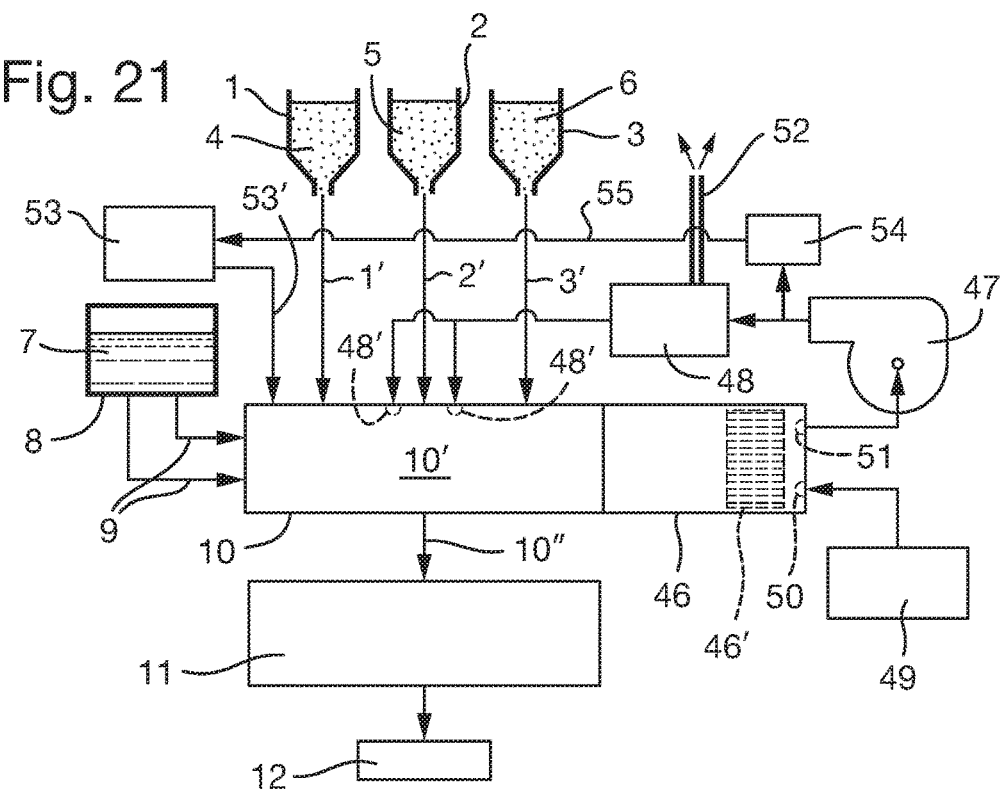

METHOD AND A DEVICE FOR MAKING A MULTI-COMPONENTS PRODUCT MATERIAL

CROSS-REFERENCE TO RELATED APPLICATIONS

This application is the U.S. National Phase under 35. U.S.C. § 371 of International Application PCT/NO2014/050081, filed May 20, 2014, which claims priority to Norwegian Patent Application No. 20130713, filed May 22, 2013. The disclosures of the above-described applications are hereby incorporated by reference in their entirety.

This application is a 371 of PCT/NO2014/050081 filed 20 May 2014

FIELD OF THE INVENTION

The present invention relates to method and a device for making a multi-components product material.

The principle of the present invention, as an example only, is described with reference to making of improved electrode mass material, e.g. for an electrode used in aluminium production. Other applications and usage of the principles of the present invention are inherently within the scope of the invention.

TECHNICAL BACKGROUND OF THE INVENTION

In order to be able to manufacture aluminium, manufacturers have to make available electrode mass to be used for electrodes in an aluminium melting bath in order to be able to produce aluminium from alumina (AlO2).

Petroleum coke or petrol coke is a carbonic solid material being a by-product or waste product from oil manufacturing, from coke making plants at oil refineries or a product resulting from other cracking processes. Petroleum coke is used for the manufacturing of silicon carbide.

Aluminium manufacturing plants are located at many places in the world. Petroleum coke being a substantial part of so-called electrode mass arrives by ship or train and is stored at in a large volume protected from weather conditions. Multiple plants for manufacturing of electrode mass are present in the world.

In order to optimize the manufacturing of aluminium, many attempts have been made to improve the quality of the electrode mass.

A drawback of the current manufacturing process of electrodes is that the electrode mass material they are made of, viz. petroleum coke and pitch, may have too low efficiency of adherence of added pitch due to large particles of the mass material having had insufficient nucleus temperature when pitch was applied. A further drawback being insufficient homogeneity in the mass material is also of great concern. These drawbacks, either separately or combined, may easily yield reduced electrode life, more use of electrode material than necessary at an aluminium production plant, more work involved due to more frequent replacement of electrodes, and above all increased cost in the overall manufacturing of aluminium due to a larger consumption of electrodes and increased maintenance cost. This in turn will inherently yield risk of complaints on product quality and observed products defects in operation.

Although heating and mixing operations of petroleum coke components and the added pitch are well known in many varieties in the prior art, it is nevertheless difficult to obtain a homogeneous mass material for making an electrode.

Insufficient homogeneity implies that conductivity at any selected location along an electrode is not the same, which is frequently caused by the coke components of varying size not mutually fitting in a proper manner and too much non-conductive, interconnecting pitch being present at some locations contrary to the amount of such pitch at other locations. Inherently, this has its origin in discharged electrode mass material having been insufficiently mixed/fluidized and with more pitch at some places in the discharged mass material mixture than at other places. To any expert in the art, this is a well known and at times also a rather problematic issue.

Further, prior art solutions have the drawback that the power consumption in making electrodes may become quite high, and not perfectly made electrodes may also add to the production cost of aluminium as regards power consumption if ohmic resistance at any location throughout the manufactured electrode is not consistent.

OBJECTS OF THE INVENTION

Thus, it has been a long felt need for an improved electrode product mass material which is substantially more homogenized and where a layer of pitch around each particle is optimized, this layer preferably to be thin and with the same thickness on all coke components. It is therefore essential in such a context to provide for its petroleum coke components, suitably having mutually different particle sizes, shapes and/or weight, to have a satisfactory homogenization before pitch is added to the coke components, in order to yield as uniform product material as possible in any specific volume thereof.

Further, the coke particles should each have a proper temperature, suitably through their entire respective body irrespective of their individual particle sizes at a time in the production when pitch is to be added, in order to yield satisfactory quality of the electrode product mass material to be made. It is not only desired to obtain a homogenous temperature profile for the coke particles of different sizes, but also to provide for the distribution of particles within a specific volume to be homogenous, i.e. to yield a homogenous mixture of particles to which pitch must be added in a process of making an electrode product mass material.

It is therefore an object of the present invention to provide methods and devices to overcome the drawbacks and deficiencies of the prior art techniques in making mass material useful for making a multi-components product.

Although a currently contemplated use of the present invention is to provide for a more homogenous electrode mass material, the present invention is, however, not in any way limited to the manufacturing of electrode mass material, but can indeed be used for the manufacturing of any homogeneous multi-components product material.

In a specific, non-limiting application of the present invention, the methods and devices as defined are particularly useful for making a multi-component material to be used for subsequent manufacturing of aluminium production electrodes. It will be appreciated that the mass material, i.e. the petroleum coke particles or particles with pitch added thereto, is subsequently discharged to a pressure and vibration operated mould to cast a final product, i.e. in the non-limiting example an electrode to be used in an aluminium production plant.

SUMMARY OF THE INVENTION

According to the present invention it is proposed that an efficient, inventive manner to carry out a homogenizing operation on the coke particles would be to use at least two sets of novel rotary shovels (to be further described) as shown and described in Norwegian Patent application no. 20130713 (currently owned by the assignee of the present PCT application). However, the shovels shown in this patent application are primarily for drying-by-heating fragmented particles and fluidizing the particles in order to output a substance for possible re-use or incineration, although it would be possible to use the technique described in the prior patent application to merely mix, fluidize and/or homogenize the components delivered into a mixing space or chamber.

Thus, using at least some of the technique described in Norwegian Patent application no. 20130713, the present invention will yield novel and inventive steps both as regards methods, devices and application of technique as defined and described in the present application. Thereby, the prior art drawbacks and deficiencies are also believed overcome by the present invention.

According to the invention, the method comprises:
  supplying in at least one step primary particle components for homogenizing thereof into a processing chamber;
  using in the processing chamber at least two rotary sets of shovels, each with a plurality of rotary shovels on a common rotary shaft in order to homogenize the primary components, the rotary shafts of the at least two sets of rotary shovels being caused to rotate in parallel in a mutually counter-rotating, homogenizing mode;
  delivering in at least one step in a fluid state and/or fine particulate material state, e.g. powder, at least one secondary component to let it interact with said primary components in the chamber while the primary components are moved around in the processing chamber by the sets of the rotary shovels; and
  discharging from the chamber as the multi-component product material the primary components as interacted with the secondary component(s) in a homogenized mixture.

According to the invention, a variant of the method comprises:
  supplying some, but not all of primary particle components for homogenizing thereof into a processing chamber as a first batch;
  using in the processing chamber at least two rotary sets of shovels, each with a plurality of rotary shovels on a common rotary shaft in order to homogenize the primary components of the first batch, the rotary shafts of the at least two sets of rotary shovels being caused to rotate in parallel in a mutually counter-rotating, homogenizing mode;
  delivering in at least one step in a fluid state and/or fine particulate material state, e.g. powder, at least one secondary component to let it interact with said first batch of primary components in the chamber while these primary components are moved around in the processing chamber by the sets of the rotary shovels;
  supplying a second batch of primary particle components into the processing chamber for homogenizing thereof, by means of said at least two sets of shovels, with the first batch of primary components therein,
  delivering in at least one step in a fluid state and/or fine particulate material state, e.g. powder, a further supply of said at least one secondary component into the chamber to let it interact with said first and second batches of primary components while these primary components are moved around in the processing chamber by the sets of the rotary shovels, and
  discharging from the chamber as the multi-component product material the first and second batches of primary components as interacted with the secondary component(s) in a homogenized mixture.

According to the invention, another variant of the method comprises:
  supplying in at least one step primary particle components for homogenizing thereof into a processing chamber;
  using in the processing chamber at least two rotary sets of shovels, each with a plurality of rotary shovels on a common rotary shaft in order to homogenize the primary components, the rotary shafts of the at least two sets of rotary shovels being caused to rotate in parallel in a mutually counter-rotating, homogenizing mode;
  delivering in at least one step in a fluid state or in a fluid and fine particulate mixture state at least one secondary component to let it interact with said primary components in the chamber while the primary components are moved around in the processing chamber by sets of the rotary shovels;
  subsequently delivering fine particulate material, e.g. as a primary component material, into the processing chamber to let it interact with the secondary component(s) already in interaction with the primary components, and
  discharging from the chamber as the multi-component product material the primary components, the secondary component(s) and the fine particulate material in a homogenized mixture.

Further embodiments of the method according to the invention are defined in the sub-claims 4-27.

According to the invention, the device comprises:
  a processing chamber with at least one supply inlet for primary particle components, said chamber configured to homogenize the primary components;
  at least two sets of rotary shovels, each set with a plurality of rotary shovels on a common rotary shaft in order to homogenize the primary components in the chamber, the rotary shafts of the at least two sets of rotary shovels being caused to rotate in parallel in a mutually counter-rotating, homogenizing mode;
  inlet(s) into the chamber for at least one secondary component in a fluid state and/or fine particulate material state, e.g. powder, and which is to interact with said primary components in the chamber while the primary components are moved around in the processing chamber by the sets of rotary shovels, and
  an outlet in a bottom region of the processing chamber to allow the primary and secondary components to be discharged from the chamber as the multi-component product material.

Further embodiments of the device according to the invention are defined in the sub-claims 29-52.

The invention is now to be described in further detail with reference to the attached drawings, the description and drawings only giving a presentation of a non-limiting example of an application of use of the invention.

In the non-limiting example, there is described an application related to making a multi-components product material to be used as electrode mass material in making electrodes for production of aluminium in a melting bath in an aluminium production plant.

It will be appreciated that structural appearance of the device can be amended without departing from essential features of the invention.

BRIEF DESCRIPTION OF THE DRAWINGS

FIG. 6 is a front view of another embodiment of the device, according to the invention.

FIG. 7 is a side view of the embodiment of FIG. 6.

FIG. 8 is a view from above of the embodiment of FIGS. 6 and 7.

FIG. 9 is a front perspective view of the embodiment of FIGS. 6-8.

FIG. 10 is a view from above of two rotary shovel sets in a homogenizer part of the device of FIGS. 1-5.

FIGS. 11 and 12 are perspective views of the respective sets of shovels.

FIG. 19 is a simplified sketch of the device of FIGS. 6-9.

FIG. 20 is a sketch shoving a simplified version of the inventive device and it related method of operation.

FIG. 21 is a sketch showing a more advanced version of the inventive device and its related method of operation.

DETAILED DESCRIPTION OF THE INVENTION

Figure 1:
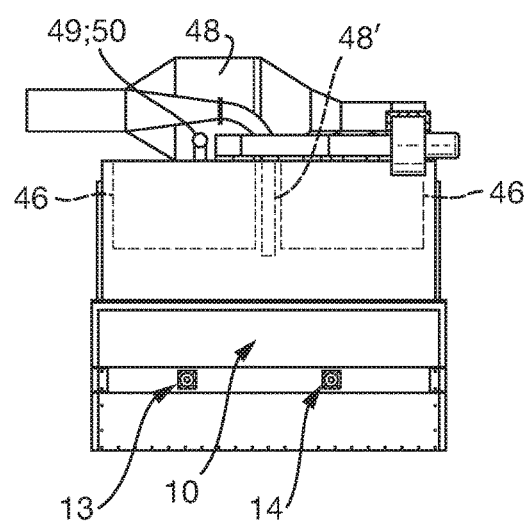
FIG. 1 is a front view of an embodiment of the device, according to the invention.

In its simplest form, the present device is as shown on FIG. 20.

In this first mode of operation containers 1, 2, 3 with primary components 4, 5, 6 of different size, respectively, are heated to provide that the petroleum coke, which comprises each of the primary components, has a correct temperature when at least one secondary component, in the example pitch 7, in heated liquid state from a tank 8 is delivered via line 9 into a chamber 10' of a homogenizer 10. It is possible to consider that more than one secondary component may need to be delivered, in which case further container(s) 8' may be provided to supply its/their contents 7' via line 9' into said chamber 10'. The pitch may in some cases contain particulate material, e.g. in powder form, or if more than one secondary component is supplied, one may e.g. be pitch and the other particulate material, as will be further described.

This way of operation is in order to obtain optimal coverage by pitch on the coke and to save time and wear in use of the final product, i.e. the electrode. However, in a production line of asphalt, the use of such pre-heating of containers is well known.

If the containers heat the coke particles/components to a correct temperature and the blender or homogenizer 10 is without any required heating inside the chamber 10', but only takes care of the addition of pitch onto the coke particles, this is the simplest approach of making the mass material.

Pitch 7 is in a conventional manner added from the pre-heated tank 8 and the proper amount is delivered to the chamber 10' via line 9 according to weight of the pitch as defined in a production prescription. Additional secondary component(s) 7' may be supplied to the chamber 10', if required, via line 9'.

The homogenizer 10 blends the secondary component(s) 7; 7', e.g. pitch and/or particulate material, and the composition of coke particles 4; 5; 6 according to size to obtain an optimal homogeneous mass material 10" which is well suited for repetitive manufacturing of electrodes.

When the electrode mass material 10" is completely made, then it is fed from the homogenizer 10 to a moulding apparatus 11 where it is compacted by applied pressure to yield the final product, i.e. the electrode 12.

With reference to e.g. FIGS. 10-12, inside the novel homogenizer 10 there are at least two sets 13; 14 of rotary shovels, each set with a plurality of rotary shovels 15-19; 20-24 on a common rotary shaft 25; 26 having respective ends 25', 25"; 26', 26" in order for the rotary shovels to homogenize the primary components 4, 5, 6 in the chamber 10', the rotary shafts of the at least two sets of rotary shovels being caused to rotate in parallel in a mutually counter-rotating, homogenizing mode by means of controllable drive motors 27; 28.

Figure 13:
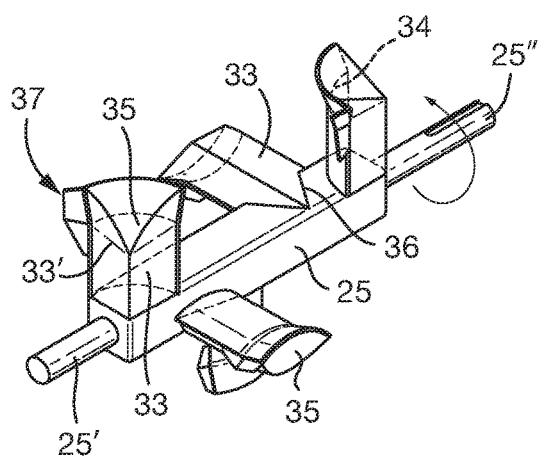
FIGS. 13 and 14 are perspective views of a modification of the respective sets of shovels.
Figure 14:
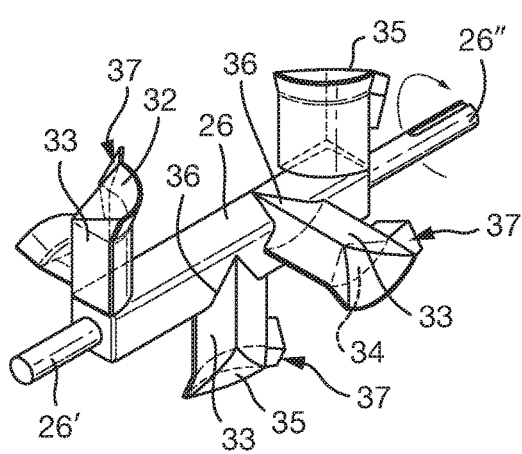
Figure 15:
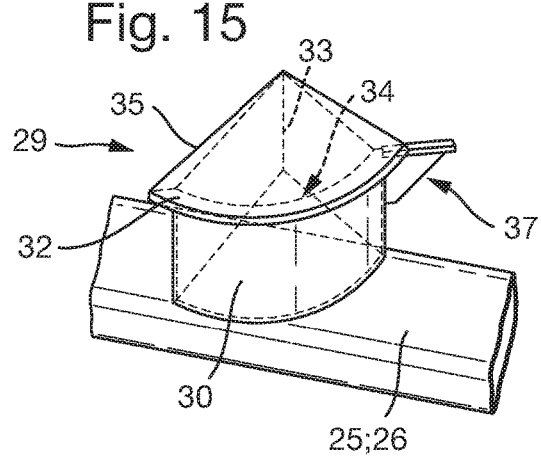
FIGS. 15, 16 and 17 show in front perspective view from above, in perspective view from one side and below, and in perspective view from below, respectively a shovel of a type as shown on FIGS. 13 and 14.
Figure 16:
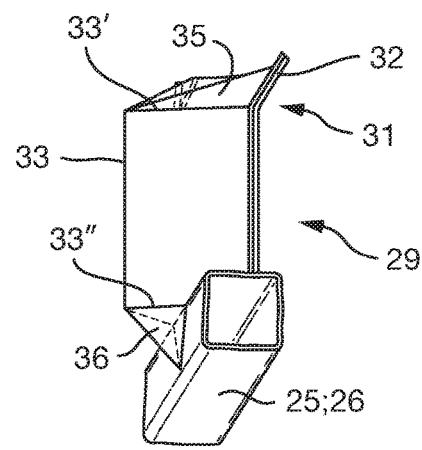
Figure 17:
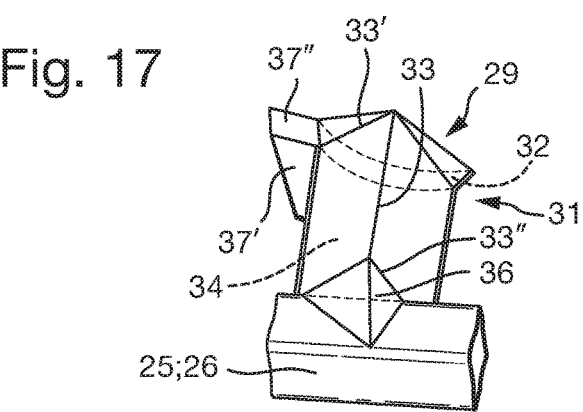

A modification of the sets 13; 14 of shovels on FIGS. 10-12 is shown on FIGS. 13 and 14 and in further detail on FIGS. 15-17.

It will be readily appreciated by an average expert in the art that more than two sets of shovels could be contemplated, as e.g. indicated on FIGS. 6-9 and 18.

Further, although in the example three primary components are indicated, a less or a greater number of component of could be used, as required. Thus, the example is in no way meant to limit the scope of the present invention.

Each shovel, on FIGS. 15-17 generally denoted by 29 as viewed radially from the rotary shaft 25; 26, has a curved cross-section so as to present upon rotation of the set of shovels a convex surface 30 to face the primary components 4, 5, 6 to be homogenized. Each shovel 29 at a radially outer region, e.g. as shown at 31, has a forwardly flared part 32 in a direction of a homogenizing mode of rotation, the outer region thereby having a forward face forming an angle with the rotary forwardly facing convex surface 30 of the remainder of the shovel. The angle will normally be set as a function of the component(s) to be processed, but the angle is often larger than 90° and less than 180°, preferably between 120° and 150°.

Figure 2:
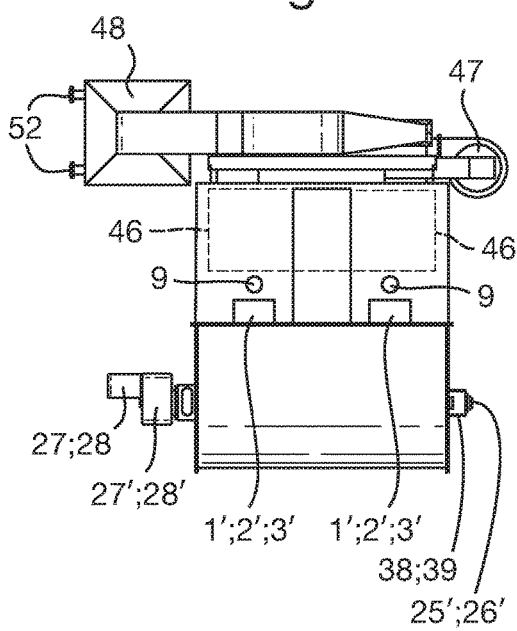
FIG. 2 is a side view of the embodiment of FIG. 1.
Figure 3:
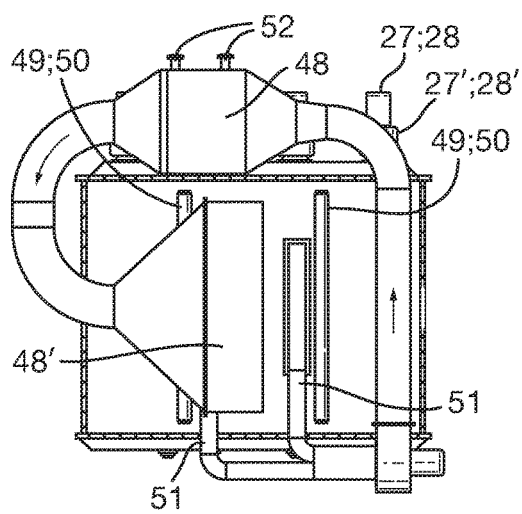
FIG. 3 is a view from above of the embodiment of FIGS. 1 and 2.
Figure 4:
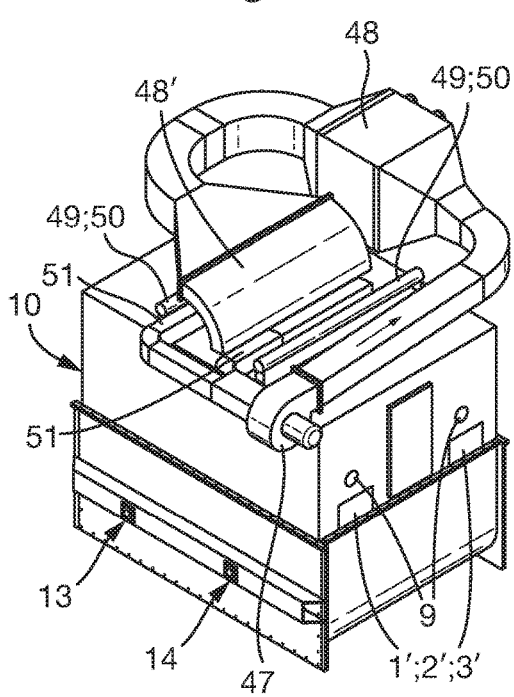
FIG. 4 is a front perspective view of the embodiment of FIGS. 1-3.
Figure 5:
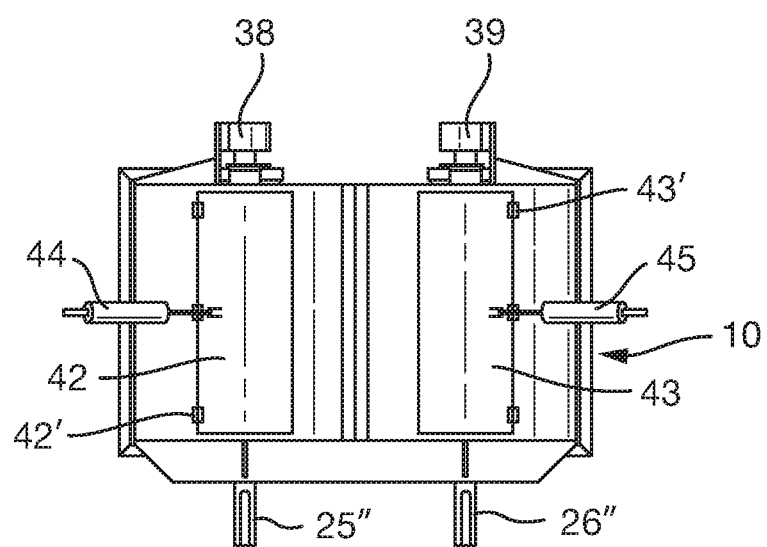
FIG. 5 is a view from below of the embodiment of FIGS. 1-4.

The shafts 25; 26 have one respective end 25"; 26" linked to drive motors 27; 28 and gear boxes 27'; 28', see FIGS. 2, 5 and 10.

The directions of rotation of the at least two sets 13; 14 of shovels could be mutually reversed upon a phase of operation causing the product material 10" to leave the chamber 10', thereby yielding a second mutually counter-rotating mode, i.e. a mode of rotation opposite to that shown on FIGS. 11, 12 and 13, 14. It is also possible to let the sets rotate in this manner simultaneously or at different rotational speeds.

In order to enhance homogenization properties for certain types of primary components, such as e.g. petroleum coke, to be processed, an aerodynamic member 33 is provided, the member 33 e.g. having a drop shaped or wedge shaped configuration and extending rearwards from a concave side 34 of the shovel, thus essentially preventing the concave surface from being visible. The aerodynamic member 33 has its widest dimension closest to said concave surface 34. The aerodynamic member 33 prevents build-up of particle-"cakes" and is useful also in a situation with a product mixture having non-consistent composition. The top 33' and bottom 33" of the member 33 will be closed, as indicated by the elements 35; 36 so that the member 33 with the associated elements 35; 36 in co-operation with the concave side 34 of the shovel constitutes a closed cavity. The aerodynamic member may be of a slightly flexible type such as e.g. of a material known as Viton® or may have a non-stick coating such as e.g. Teflon®. It could be made of a rigid material if e.g. provided with as non-stick coating.

Such aerodynamic member 33 may be particularly suitable for use in the case that the components which are to be processed, i.e. to be dried and/or heated, as well as to be homogenized, include fractions of fine particulate materials, and/or being combined with addition of liquids from low to high viscosity.

The issue of a build-up of finely divided particulate material on the rear side (concave side) 34 of a shovel is indeed of concern when processing some specific types of material. The problem is that when such build-up of material detaches from a shovel, it will be in the form of large lumps. This must be avoided when processing e.g. finely divided particulate material or powder type of material having air inducing powders and powders having properties of static electricity build-up or formation of crystalline bonding.

Further, in the present context, homogenizing primary components like petroleum coke of different sizes is a challenge, and it is important not to have shovels with an open concave rear side at which build-up of sticky coke particles as well as pitch could occur, thereby creating operational problems. Thus, with the use of an aerodynamic member 33 as generally described, there will no longer be present a visible concave region on rear side of the shovel for build-up of such problematic material to be processed.

As shown on FIGS. 10 through 19, the shovels are located on horizontal tubular shafts 25; 26 having a square cross-section. FIG. 19 shows a configuration with a total of four sets of shovels 13, 14, 13', 14'. The operation and configuration of the sets 13', 14' are comparable to the operation and configuration of the sets 13, 14.

This yields a most suitable sub-dividing of the shovels from a manufacturing point of view with shovels on each side of the square profile. In the examples shown, one side may have two shovels and the other sides just one shovel. However, this is not to be construed as a limitation of the embodiment, as there may be more shovels on either side, dependent on the axial length of the shafts 25, 26. Shovels can also be mounted diagonally, with 180° in between in each longitudinal segment, or even by every 90° for certain processes.

In order to obtain with the at least one rotary set of shovels enhanced properties, as regards lifting capability on the particulate primary components which are to be homogenized, possibly be heated and/or dried or otherwise processed, both radially and tangentially, as well as obtaining an increased arc length in axial direction, the shovel 29 having the features of as just described could be further improved.

As mentioned above, the shovel 29 has a convex side 30 and the rear of the side thereby forming a concave side 34, the concave side however being covered by said aerodynamic member 33. The improvement involves a wing-like side member 37 at a radially extending side edge of the convex side 30. The member 37 has a radially extending part 37' and a forwarded flared part 37" at a radially outer region thereof. In an embodiment of the invention, these two parts 37', 37" are suitably turned forwardly in the direction of rotation to form an angle with said convex side 30. The member 37 contributes to the enhanced properties as mentioned above. It will be appreciated that the shovels located on a rotary shaft 25; 26, as shown on FIGS. 10-14, could be located in any suitable position thereon, e.g. as tentatively indicated. The wing-like member 37 will enhance particle lifting and deployment/spreading, thereby improving homogenization properties within the chamber.

FIGS. 13-17 relate to the advantageous use of the wing-like member 37 together with the previously described advantageous properties of the aerodynamic member 33. When viewing FIGS. 13-17, it is noted that dependent on the angle which the shovel 29 together with the member 33 forms with a longitudinal axis of the rotary shaft 25; 26, a radially innermost region 33" of the member 33 may project outside a longitudinal edge of the shaft 25; 26. In such a case a kind of hollow tetrahedron structure 36 may link such innermost region 33" with an adjacent side of the shaft 25; 26. The structure 36 forms obtuse angles with the shaft 25; 26, thereby avoiding that troublesome particulate components are accumulated at that region.

Although only two sets 13; 14 of shovels are shown on FIGS. 10-14, it would be obvious to provide further sets if available space permits at a location where the invention is to be applied. Although in certain cases, it would be conceivable to use only one set of shovels or operate only one set of shovels at one time, e.g. alternately, it is a currently preferred embodiment to use more than one set of shovels, e.g. the two sets as currently shown on the drawings, see FIGS. 1-5, 10-14 and 18, or more than two sets, e.g. four sets of shovels, as currently shown on FIGS. 6-9 and 19.

Using a square cross-section for the shafts 25; 26 it becomes very simple to position the respective shovels on the shafts with proper and preferred angular orientation or "twisting" relative to an axial direction of the shaft or the rectilinear sides of the shaft. A shaft with a square cross-section has also an inherent high stiffness or rigidity against twisting about and bending relative to its longitudinal axis. Although the shafts 25; 26 may have, as seen from their outside, a square cross-section, a shaft with a circular cross-section could be mounted inside the shaft of square cross-section and be fixedly attached thereto by welding, gluing, bolts or screws and be supported at one end 25'; 26' by roller bearings 38; 39 at one end and letting the other end 25"; 26" engage the respective gear boxes 27'; 28' which are operated by respective motors 27; 28.

The shafts of circular cross-section when passing through the walls of the chamber 10' are sealed against fluid leakage to the outside by means of a packing material (not shown) riding on the circumference of the shafts thereat.

Figure 18:
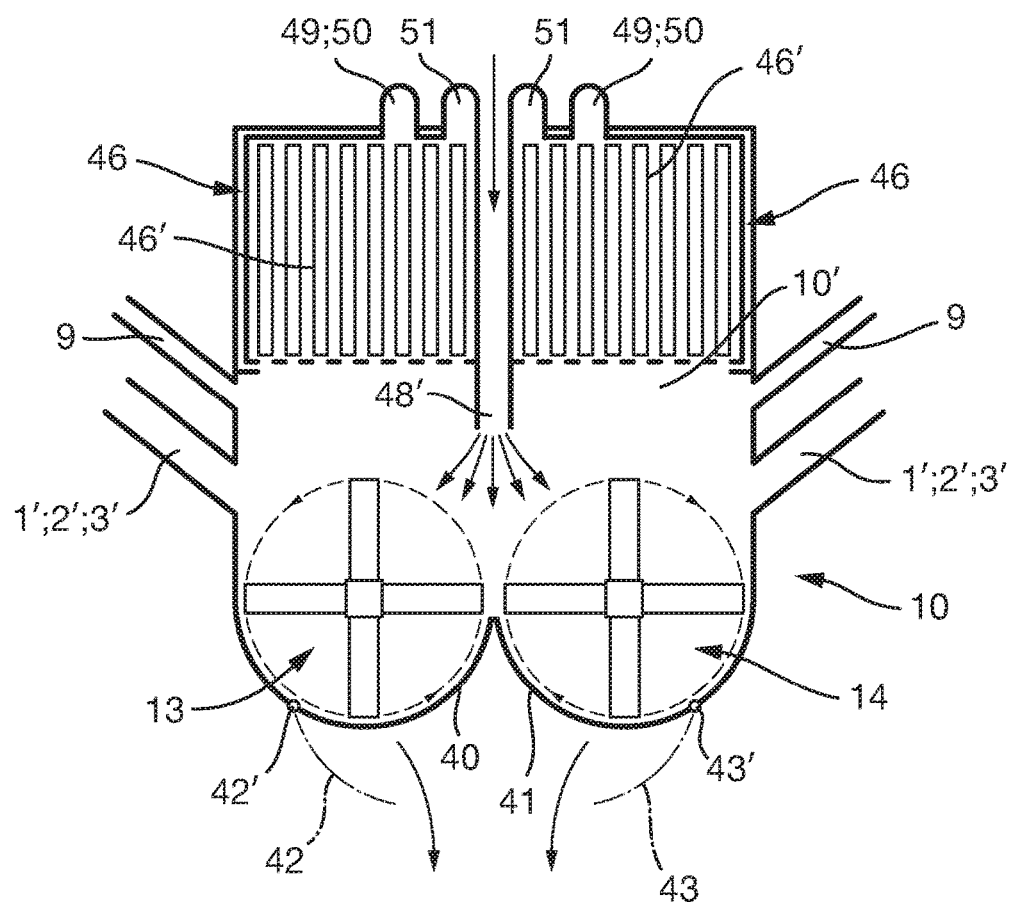
FIG. 18 is a simplified sketch of the device of FIGS. 1-5.

It is clearly seen from e.g. FIG. 18 that the two sets 13, 14 of rotary shovels paddle along a respective curved or semi-circular floor 40; 41 of a lower region of the homogenizer 10. The radius of curvature is approximately or slightly more than a half of the diameter of rotation of each of the two sets 13, 14. A clearance of 10-15 mm between a sweeping shovel and the floor 40; 41 may be suitable, but in certain cases the clearance could be increased or made less. A major issue is merely to avoid that the shovels become jammed against the floor due to very hard artifacts that could cause such jamming and even damage the shovels or overload the drive motors 27; 28 of the sets 13; 14 of shovels.

As indicated on FIGS. 5 and 18, and on FIG. 19 (in case of four sets of shovels), there may be provided a pair of trap doors 42, 43 which are hinge-linked at locations 42' and 43' to the remainder of the bottom parts 10" of the chamber 10'. The trap doors 42, 43 are suitably movable by means of electrically operated, hydraulic or pneumatic rams 44; 45. Thereby, the product material 10" made in the chamber 10' may be discharged into a product making apparatus 11, such as e.g. a pressurized mould, in order to make the final product 12, such as e.g. an electrode for use in manufacturing aluminium.

In a second and alternative mode of operation, see FIG. 21, the homogenizer 10 is supplied with cold petroleum coke 4; 5; 6 from a respective container or hopper 1; 2; 3 and the coke 4; 5; 6 will enter chamber 10' via supply lines 1'; 2'; 3'. The coke is supplied with heat energy from a heating agent yielding increased temperature of the coke in that the homogenizer 10 is associated with a heating agent loop where the heating agent can be delivered to the chamber 10' and heat the coke therein, and then leave the chamber 10' in order to be recycled, i.e. re-used. The heating agent is e.g. superheated steam or inert gas (e.g. atmospheric nitrogen), although other types of fluid may be used, as required.

Some component(s) to be processed in the chamber 10' may be inflammable or cause the atmosphere in the chamber 10' to be inflammable, and in such a case the heating agent should be of a nature which prevents any fire in the chamber 10' or its vicinity, thereby avoiding a risk of an explosion.

It may in a particular application, e.g. when making an electrode product material 10", be of advantage to pre-heat at least one of the primary components before all of the primary components are heated, and dried, if required, in the chamber 10'. In this process, the fan 47 will operate to provide a required circulation volume per time unit of the heating agent.

The loop includes a filter unit 46 at a heating agent exit end 51 of the homogenizer chamber 10', a fan 47 downstream thereof, and a heater 48 downstream thereof for the heating agent and upstream of heating agent inlet(s) 48' to the chamber 10'. In addition, there is present a tank 49 of pressurized fluid, such as e.g. nitrogen, to shoot such fluid via filter unit inlets 50 into filter bags 46' of the filter unit 46 in order that the filter unit 46 retains its ability to filter petroleum coke dust. The filter unit outlet 51 serving also as the heater agent exit end from the chamber 10' may be located at the same location as the inlets 50, if possible.

In addition, there is an evacuation line 52, suitably associated with the heater 48 to evacuate the shooting fluid and the small amount of air which inherently is present in the supplied petroleum coke. The evacuated fluid may either be recycled or ventilated into the open air, i.e. the environment, via line 52.

When the petroleum coke has the right temperature, then heated pitch 7 is supplied into the homogenizing chamber 10' via line 9 to mix with the coke 4, 5, 6, yielding that the product material 10" exiting the chamber 10' has an optimal homogenous property when supplied to the mould 11 in which the electrode 12 is made.

As indicated above, the homogenizer is associated with a heating agent supply, suitably in the form of dry, superheated steam or inert gas, e.g. nitrogen, in a closed loop configuration, suitably delivered from a supply 53. A sensor 54 is suitably located at a branch-off from the loop, e.g. at the outlet of the fan 47. The sensor is capable of sensing the properties of the heating agent, such as e.g. amount of inert gas therein, gas composition, its temperature etc. If the required property of the heating agent is not met, the sensor 54 may via line 55 trigger the supply 53 to deliver proper heating agent add-on via line 53' to the heating agent via the chamber 10', and the heater 48 may be required to increase the temperature of the heating agent. As indicated above, the heating agent also serves to prevent any risk of explosions inside the chamber 10'.

The second component(s), in the present case exemplified as pitch 7, will be supplied from a tank or reservoir 8 via one or more lines 9, the pitch being supplied according to required weight value thereof and in a pre-heated state to have a satisfactory fluid flow into the chamber 10'. If it is desired to have not only one secondary component, but at least two, additional reservoir(s) and associated supply lines may be provided, as indicated by references numeral 7' and 8' on FIG. 20.

When a supply of secondary component(s) is made to the chamber 10' via line(s) 9; or 9; 9', the fan 47 is made inoperative to avoid e.g. a mist of small particles of the secondary component(s) to be drawn to the filter unit 46 and its filter bags 46', thereby avoiding a potential clogging of the bags. However, the sets 13, 14; 13'; 14' of shovels will rotate in order to aid the secondary components to settle on or interact with the primary component(s).

Once the secondary component(s) have settled onto or have interacted with the primary components, then the fan 47 may be re-started, or await re-starting until the made product material 10" has been discharged from the chamber 10' and a new batch of primary component(s) is fed into the chamber 10' for processing therein.

During the heating process, the sets 13, 14; 13'; 14' of shovels will rotate and the fan will operate to maintain a circulation of heating agent.

The heating agent will not only heat the primary component(s), e.g. coke, but also provide a drying function to dry off any unwanted moisture in or on such primary components. Thus, the heating agent also serves as drying agent. Using this approach along with the second mode of operation, there is achieved also control as regards moisture in case there is water or other liquids present in or on the primary components and which in the context are to be considered as pollutions and will be a bar to obtain an optimal production result, the control being achieved by having a combined heating and drying process in the homogenization chamber 10'.

As indicated on FIG. 21, the heating agent/drying agent is delivered into the chamber 10' via inlets 48'. As indicated on FIGS. 18 and 19 the heating agent/drying agent suitably enters the chamber 10' at a center location thereof via inlet(s) 48'.

An advantage of the second mode of operation is that the electrode mass material 10" in this case also becomes homogenized as regards temperature in a repetitive manner. Thereby, complaints related to electrode mass material 10" of poor or insufficient quality will be non-existent.

As indicated above, it is also possible to a certain extent to combine the first and second modes of operation. In such a case, heating of the container(s) having the largest particle size(s) takes place or the containers having large particles of different sizes, respectively, are heated, i.e. causing heating of the primary components which take the longest time to heat all the way into the particle nucleus.

However, it may be conceivable that it is not required to heat the larger ones of the particles all the way into the nucleus thereof, but merely e.g. halfway towards the nucleus so that there obtained a satisfactory application of pitch onto the available surface of the coke before the lower nucleus temperature causes the pitch to solidify. Such a manner to carry out the process may yield a higher consumption of pitch than if the coke is heated enough to cause the nucleus of the primary component to have a desirable temperature. The critical point to be considered is that the rest of the mixture should be satisfactorily homogenized before the pitch is introduced and is caused to settle on or interact with the primary components and be cooled or solidified/get a higher viscosity property on the surface of the larger particles.

The processing chamber 10' and the at least two sets of rotary shovels 13, 14; 13' 14' are suitably configured to process primary components 4; 5; 6 which are of a single type of material. As described earlier, homogenizing action is performed by the sets 13; 14; 13'; 14' of rotary shovels.

However, the primary components could just as well be of mutually different types of material. In a further variant, the primary components to be processed could be a mixture of differently sized particles, or they could be a mixture of particles having substantially same size or weight.

In e.g. the production of electrode product material the primary components are normally comprised of batches having mutually different particle size. When all batches are supplied into the chamber 10' to be homogenized simultaneously, there may be a tendency that a comparatively larger amount of the secondary component(s), e.g. a binder such as pitch, will interact with, settle on or adhere onto the smallest particle size components than onto the larger particle size components supplied into the chamber 10'. Such a situation is not desirable, as it will yield a much higher consumption of secondary component(s) than necessary.

It is therefore advantageous to supply in a first step the primary components which have a larger particle size, e.g. components 4 and 5, into the chamber 10' and homogenize these components and add the secondary component 7; 7' into the chamber 10' to interact with or adhere onto these larger primary components, before—in a second step—the primary components having smallest particle size, e.g. components 6, are added into the chamber 10' and are caused to be homogenized with the primary components having the larger particle size and which have already interacted with the secondary component(s) 7; 7' and an amount of secondary components 7; 7' is added into the chamber 10' to interact with or adhere onto the smaller particle size primary components 6 and as well as on the larger particle size components 4; 5.

An important aspect of this exemplary use of the invention is that the layer of pitch on the primary components should have as uniform thickness as possible. The primary components 4; 5; 6 will, according to the invention, obtain approximately the same amount of surface thickness of the secondary component(s) 7; 7'.

As indicated on FIG. 20, but equally applicable as regards the embodiment shown on FIG. 21, multiple inlets 9; 9' into the processing chamber 10' from tanks 8; 8' could be provided to enable multiple second components 7; 7' to be delivered in succession or simultaneously to the processing chamber to yield multiple layers of second components 7; 7' on the primary components 4; 5; 6.

The direction of rotation of the shafts 25; 26 of at least one of the at least two sets 13; 14; 13'; 14' of shovels is optionally reversible upon a phase of operation involving the final product to leave the processing chamber. For certain types of final product material leaving the chamber 10', such reversed direction of rotation will in an efficient manner enhance discharging of the final product from the chamber 10' when the doors 42; 43 in the bottom region or floor 40, 41 of the chamber 10' of the homogenizer 10 open to provide a discharge position for the material 10", as indicated on FIGS. 18 and 19.

As described in the exemplifying embodiments above, the at least one secondary component is a binder agent for the primary components. In another embodiment, the secondary component(s) could have properties other than being a binder agent, or at least one of the secondary components could have other properties. As such, it could be visualized that a first type of secondary component is applied onto the primary components to seal pores in the primary components, and the binder agent as second type of secondary component is subsequently applied.

In another application of the invention, the primary components need not be petroleum coke, but could be any other type of material(s) to be mixed with the secondary component(s). As such, it is contemplated that a part of the primary components could be in a fine particulate material, e.g. in powder form, and could be mixed into the pitch material and the mixture supplied into the chamber 10' as the secondary component(s). The advantage of such approach is that a uniform mixture of pitch and fine particulate material, e.g. powder is supplied to interact with the homogenized primary components already in the chamber.

Such an approach, i.e. mixing a fine particulate material, such as powder, into the pitch will still yield sprayable secondary component(s), and an improved coverage on the primary components already in the chamber 10' is obtained. However, the viscosity will increase and may in certain cases yield not optimal coverage. In such a case, a volatile component, e.g. Hexan®, could be added to the mixture, although other volatile components could be used.

As an alternative, said powder and said pitch could be supplied into the chamber 10' simultaneously from different locations.

Still another approach could be to let a secondary component, such as pitch, be supplied to the chamber 10' to interact with/settle on the surface of the primary components in the chamber, and then in a next step supply a fine, particulate material, e.g. powder, into the chamber to interact with the pitch already on or having interacted with the primary components. Such fine particulate material could be of the same type of material as the primary components or with same material properties as the primary components, although it may be of a type entirely different from the material of the primary components.

In other applications than the present one, the secondary component(s) need not be a binder or be a material in liquid form. In general, it could be in fluid form or as a fine particulate material, e.g. powder. It could in a particular application be e.g. one of: a plasma, a gas, a gas having the property of being able to condense and settle on cold primary components, or a powder.

If a powder is applied, it should be able to adhere to the primary components, suitably by aid of static electricity or the primary components having a slightly sticky surface. In such a case, it could also be envisaged that application of heat into the chamber 10' could change the properties of the powder, e.g. to melt and become sticky, to melt and subsequently solidify, to melt and migrate into the primary components, to change its adherence to the primary components, or change its physical appearance related to e.g. evenness or colour.

It could also be envisaged that interaction of the secondary component(s) with the primary component(s) could imply that such secondary component(s) will e.g.:
   migrate into the body of the first components,
   change surface properties of the primary component,
   cause a chemical reaction between the two types of
      components, or cause the second component to adhere to the first components and be transformable into another property when subjected to heat, artificial ultraviolet light or another second component of a different type.

Other variations as regards use of the method and the device are all within the framework of the present invention and easily put to practice by the average expert in the art.

The use of the present invention, in particular used with the novel sets of shovels will result in substantial advantages over the prior art solutions, inter alia:

1. Reduction of formation of cracks in cast electrodes 12 due to the electrodes being made from a completely homogeneous mixture of coke and pitch.
2. Reduction of electrode consumption because the electric current flux is uniform from the entire surface of the electrode.
3. Reduction of electrode consumption does yield formation of damages or any concavities on the electrode surface.
4. Reduction of electrode residues in manufactured aluminium, implying a cleaner quality of the manufactured aluminium bars.
5. Less need for removal of slag residues from the melting bath.
6. Less operator costs due to longer life of the electrode.
7. Less complaints both in-house and externally when selling electrodes to other manufacturers of aluminium bars.
8. Increased sale of high quality electrodes is made possible.
9. Reduction of power consumption in the manufacturing of aluminium.
10. Reduced power consumption in making electrode mass material 10".
11. Reduced costs when casting electrodes 12 due to less need for removing electrodes having cracks and milling thereof for recycling of the electrode material for re-use.
12. Less need for use of milling and sieving systems for electrodes having cracks.
13. Reduced structural volume of electrode material manufacturing plant.
14. Reduced need for electrical installations at production plants for making the electrode material.
15. Reduced operation and maintenance costs are provided due to simpler structural configuration. (Currently used components blenders require substantial amount of maintenance due to abrasive wear, and do not offer a product material being satisfactory homogeneous, although such blenders are frequently used in the metals industry and foundries).

As indicated in the introduction and the detailed description, the current invention is not all limited to the making of electrode manufacturing material.

Indeed, all typical processes which involve blending of particles with one or more types of binders are always dependent on obtaining a homogeneous compound or mixture material in order to subsequently be able to manufacture a final product having optimal quality.

Most current technical solutions related to such processes all have deficiencies as regards efficiency of homogenization. One example of such a process is the manufacturing of asphalt, irrespective of whether it is warm asphalt or cold asphalt.

What is claimed is:

1. A method for making a multi-components product material, the method comprising:

a) supplying in at least one step primary particle components for homogenizing thereof into a processing chamber;
b) using in the processing chamber at least two rotary sets of shovels, each with a plurality of rotary shovels on a common rotary shaft in order to homogenize the primary components, the rotary shafts of the at least two sets of rotary shovels being caused to rotate in parallel in a mutually counter-rotating, homogenizing mode;
c) delivering in at least one step in one of: a fluid state, a fine particulate material state, and a mixture of a fluid state and a fine particulate material state, at least one secondary component to let it interact with said primary components in the chamber while the primary components are moved around in the processing chamber by sets of the rotary shovels; and
d) discharging from the chamber as the multi-component product material the primary components as interacted with the secondary component(s) in a homogenized mixture, wherein the primary particle components and the fine particulate material are made from petroleum coke,
wherein the secondary component in fluid state is pitch,
wherein a heating agent is supplied into the processing chamber to heat at least partly the primary particle component being homogenized therein and to dry off any unwanted liquid moisture from the primary components, and
wherein the discharged multi-component product material which exits the processing chamber is directly delivered to a downstream product finalizing stage to enable by pressure moulding a final product being an electrode.

2. The method of claim 1, wherein between said
delivering and discharging steps further delivering fine particulate material, as a primary component type of material, into the processing chamber to let it interact with the secondary component(s) already in interaction with the primary components.

3. The method of claim 1, wherein the secondary component(s) being a mixture of a fluid and a fine particulate material, and wherein a viscosity lowering material is added to the mixture before launching thereof into the processing chamber.

4. The method of claim 1, wherein fluid and fine particulate material are delivered into the processing chamber simultaneously as separate batches.

5. The method of claim 1, wherein the fluid state component of the secondary substance(s) is a sprayable liquid type material.

6. The method of claim 1, wherein the fine particulate material is a powder, and is of a same type of material or property as at least one of the primary particle components.

7. The method of claim 1, wherein superheated steam or inert gas is used as the heating agent.

8. The method of claim 1, wherein the secondary component(s) being delivered into the processing chamber as sprayed liquid.

9. The method of claim 1, wherein the heating agent is allowed to exit the chamber via a filtering unit, and to be re-entered into the chamber subsequent to passing through a heater.

10. The method of claim 1, wherein the primary components are of a single type of material.

11. The method of claim 1, wherein the primary components are of mutually different types of material.

12. The method of claim 1, wherein the primary components are batches of mutually differently sized particles.

13. The method of claim 1, wherein multiple second components are delivered in succession to the processing chamber to yield multiple layers of second components on the primary particle components.

14. The method of claim 1, wherein composition status and property of the heating agent is sensed upstream of a heating agent inlet to the chamber, and wherein a heating agent restoring fluid is supplied to the processing chamber to restore the heating agent to its nominal properties.

15. The method of claim 14, wherein the heating agent restoring fluid is one of inert gas, vapour, superheated steam and air.

16. The method of claim 1, wherein the at least one secondary component is a binder agent for the primary particle components.

17. The method of claim 1, wherein for making a multi-components product material, the method comprising:
- in a first step supplying some, but not all of primary particle components into the processing chamber as a first batch to be homogenized by means of the at least two sets of rotary shovels;
- delivering in at least one step, in at least one of a fluid state and fine particulate material state, at least one secondary component to let it interact with said first batch of primary particle components in the chamber while these primary particle components are moved around in the processing chamber by the sets of the rotary shovels;
- in a further step supplying into the processing chamber a second batch of primary particle components for homogenizing thereof with the first batch of primary particle components therein by means of said at least two sets of shovels,
- delivering in at least one further step, in at least one of: a fluid state and fine particulate material state, a further supply of said at least one secondary component into the chamber to let it interact with said first and second batches of primary particle components while these primary particle components are moved around in the processing chamber by the sets of the rotary shovels, and
- the first and second batches of primary particle components as interacted with the secondary component(s) in a homogenized mixture being discharged as the multi-component product material to exit the processing chamber and to be directly delivered to the downstream product finalizing stage to enable by pressure molding said final product being said electrode.

* * * * *